(12) United States Patent
Lee

(10) Patent No.: US 11,220,577 B2
(45) Date of Patent: Jan. 11, 2022

(54) POLYAMIDE COMPOUND

(71) Applicant: TOYOTA BOSHOKU KABUSHIKI KAISHA, Aichi (JP)

(72) Inventor: Chihan Lee, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 129 days.

(21) Appl. No.: 16/773,199

(22) Filed: Jan. 27, 2020

(65) Prior Publication Data

US 2020/0247950 A1 Aug. 6, 2020

(30) Foreign Application Priority Data

Jan. 31, 2019 (JP) .............................. JP2019-015430

(51) Int. Cl.
*C08G 69/26* (2006.01)
*C08G 69/02* (2006.01)

(52) U.S. Cl.
CPC .............. *C08G 69/26* (2013.01); *C08G 69/02* (2013.01)

(58) Field of Classification Search
CPC ......... C08L 77/00; C08L 77/06; C08G 69/26; C08G 69/02
See application file for complete search history.

(56) References Cited

U.S. PATENT DOCUMENTS

| | | | | |
|---|---|---|---|---|
| 2018/0127544 | A1* | 5/2018 | Lee .......................... | C08G 69/42 |
| 2018/0148625 | A1* | 5/2018 | Wagle ..................... | C09K 8/032 |
| 2020/0377773 | A1* | 12/2020 | Briffaud ................. | B32B 15/085 |

FOREIGN PATENT DOCUMENTS

FR WO 2017174949 * 10/2017

OTHER PUBLICATIONS

USPTO structure search, Jul. 2021.*
M. Hendrich et al., "Biomimetic Triblock and Multiblock Copolymers Containing L-Phenylalanine Moieties Showing Healing and Enhanced Mechanical Properties", Journal of Polymer Science, Part A: Polymer Chemistry, 53, Jul. 27, 2015, pp. 2809-2819.
E. D'Elia et al., "Self-Healing Graphene-Based Composites with Sensing Capabilities", Advanced Materials. 27, 2015, pp. 4788-4794.

* cited by examiner

*Primary Examiner* — Gregory Listvoyb
(74) *Attorney, Agent, or Firm* — Greenblum & Bernstein, P.L.C.

(57) ABSTRACT

A novel polymer having self-healing properties is provided. The polyamide compound contains a dicarboxylic acid unit represented by the following formula (1) and a diamine unit represented by the following general formula (2). This polyamide compound is excellent in self-healing properties.

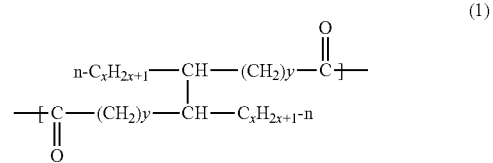

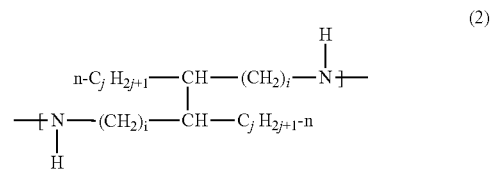

5 Claims, No Drawings

POLYAMIDE COMPOUND

CROSS-REFERENCE TO RELATED APPLICATION

This application claims the benefit of Patent Application No. 2019-15430 filed in Japan on Jan. 31, 2019, the contents of which are incorporated herein by reference.

BACKGROUND OF THE INVENTION

The present disclosure relates to a polyamide compound.

Polymers having self-healing properties (self-curing properties) are known. Conventional polymer skeletons having self-healing properties are urethane and urea (see, for example, Non-Patent Literatures 1 and 2). These polymers have self-healing properties due to increase of intermolecular hydrogen bonds.

At present, only limited polymers such as the aforementioned urethane-based polymers have been developed as polymers having self-healing properties. Therefore, the scope of application is limited only with these limited polymers.

In addition, conventional polymers having self-healing properties require a long time for self-healing.

Under such circumstances, the development of a novel polymer having self-healing properties is desired.

CITATION LIST

Non-Patent Literature

Non-Patent Literature 1: M. Hendrich, L. Lewerdomski, P. Vana. J. Polymer Science, Part A: Polymer Chemistry, 53, 2809-2819 (2015).

Non-Patent Literature 2: E. D'Elia, S. Barg, N. Ni, V. G. Rocha, E. Saiz. Advanced Materials. 27, 4788-4794 (2015).

BRIEF SUMMARY OF THE INVENTION

The present invention has been made in view of the above situations, and an object thereof is to provide a novel polymer having self-healing properties.

In view of the above-described conventional techniques, the present inventors have developed a novel polyamide compound as a result of intensive studies.

The inventors have found the fact that this novel polyamide compound has self-healing properties. The present invention has been made based on this finding.

Specifically, a first aspect of the present invention is a polyamide compound containing:

a dicarboxylic acid unit represented by the following general formula (1); and a diamine unit represented by the following general formula (2):

[Chemical Formula 1]

$$\text{n-C}_x\text{H}_{2x+1}-\text{CH}-(\text{CH}_2)_y-\overset{\text{O}}{\underset{\|}{\text{C}}}\underset{}{\phantom{-}}\quad (1)$$
$$-\!\!\left[\overset{\text{O}}{\underset{\|}{\text{C}}}-(\text{CH}_2)_y-\text{CH}-\text{C}_x\text{H}_{2x+1}\right]_{\!-n}$$

wherein x represents an integer from 6 to 12, and y represents an integer from 8 to 18; and

[Chemical Formula 2]

$$\text{n-C}_j\text{H}_{2j+1}-\text{CH}-(\text{CH}_2)_i-\overset{\text{H}}{\underset{|}{\text{N}}}\underset{}{\phantom{-}}\quad (2)$$
$$-\!\!\left[\overset{}{\underset{|}{\text{N}}}-(\text{CH}_2)_i-\text{CH}-\text{C}_j\text{H}_{2j+1}\right]$$
$$\phantom{-}\overset{}{\underset{\text{H}}{\phantom{|}}}$$

wherein i represents an integer from 2 to 12, and j represents an integer from 2 to 18.

The polyamide compound of the present invention is excellent in self-healing properties (self-curing properties). Here, the self-healing properties mean such properties that, when a formed body made of a polyamide compound is cut and the cut surfaces are brought into contact with each other, the cut surfaces are bonded to each other, so that the cut surfaces disappear or decrease, returning to the original state (being restored).

DETAILED DESCRIPTION

The particulars shown herein are by way of example and for purposes of illustrative discussion of the embodiments of the present invention only, and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

A second aspect of the present invention is the polyamide compound, wherein, in the dicarboxylic acid unit represented by the general formula (1), x=9 and y=11, and, in the diamine unit represented by the general formula (2), i=9 and j=8.

Hereinafter, the present disclosure will be described in detail.

[1] Polyamide Compound

The polyamide compound of the present disclosure contains a dicarboxylic acid unit represented by the following general formula (1) and a diamine unit represented by the following general formula (2).

[Chemical Formula 3]

$$\text{n-C}_x\text{H}_{2x+1}-\text{CH}-(\text{CH}_2)_y-\overset{\text{O}}{\underset{\|}{\text{C}}}\underset{}{\phantom{-}}\quad (1)$$
$$-\!\!\left[\overset{\text{O}}{\underset{\|}{\text{C}}}-(\text{CH}_2)_y-\text{CH}-\text{C}_x\text{H}_{2x+1}\right]_{\!-n}$$

wherein x represents an integer from 6 to 12, and y represents an integer from 8 to 18;

x is preferably an integer of 8 to 10; and y is preferably an integer of 9 to 13, and

[Chemical Formula 4]

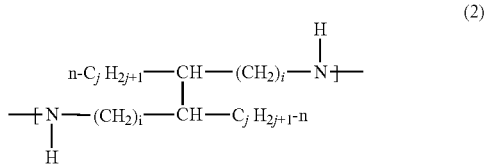

(2)

wherein i represents an integer from 2 to 12, and j represents an integer from 2 to 18.

The polyamide compound of the present disclosure may further contain a structural unit other than those described above, as long as the effects of the present invention are not impaired.

In the polyamide compound of the present disclosure, the content of the dicarboxylic acid unit is not particularly limited. The content of the dicarboxylic acid unit is usually 5 to 50 mol %, preferably 20 to 50 mol %, more preferably 30 to 50 mol %.

In the polyamide compound of the present disclosure, the content of the diamine unit is not particularly limited. The content of the diamine unit is usually 5 to 50 mol %, preferably 20 to 50 mol %, more preferably 30 to 50 mol %.

The proportions of the contents of the dicarboxylic acid unit and the diamine unit are preferably substantially the same from the viewpoint of the polymerization reaction, and the content of the dicarboxylic acid unit is more preferably ±1 mol % of the content of the diamine unit.

[1-1] Dicarboxylic Acid Unit

The polyamide compound of the present disclosure contains a dicarboxylic acid unit represented by the following general formula (1) as described above.

[Chemical Formula 5]

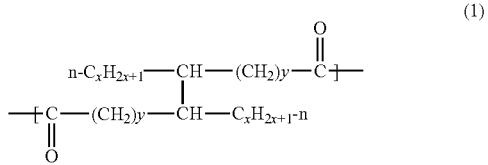

(1)

wherein x represents an integer from 6 to 12, and y represents an integer from 8 to 18.

As the dicarboxylic acid unit, a unit represented by the following formula is particularly preferred. The unit shown in the following formula is derived from a plant, which is preferable from the viewpoint of preventing global warming and reducing resource risk.

[Chemical Formula 6]

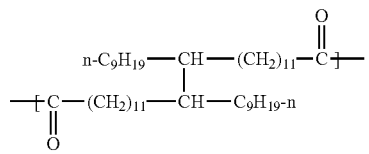

When the total of the dicarboxylic acid units in the polyamide compound of the present disclosure is 100 mol %, the content of the dicarboxylic acid unit represented by the general formula (1) is not particularly limited. The dicarboxylic acid unit represented by the general formula (1) is preferably contained in an amount of 30 to 100 mol %, more preferably 50 to 100 mol %, particularly preferably 70 to 100 mol %. This is because when the content of the dicarboxylic acid unit represented by the general formula (1) is within this range, excellent self-healing properties are obtained.

The compound that can constitute a dicarboxylic acid unit other than the dicarboxylic acid unit represented by the general formula (1) is not particularly limited.

Specific examples of dicarboxylic acid compounds include, for example, linear aliphatic dicarboxylic acids with 2 to 25 carbon atoms such as oxalic acid, malonic acid, adipic acid, fumaric acid, maleic acid, succinic acid, glutaric acid, adipic acid, pimelic acid, suberic acid, azelaic acid, sebacic acid, and dodecanedioic acid; or aliphatic dicarboxylic acids such as dimerized aliphatic dicarboxylic acids (dimer acids) with 14 to 48 carbon atoms obtained by dimerization of unsaturated fatty acids obtained by fractional distillation of triglycerides and hydrogenated products (hydrogenated dimer acids) thereof; alicyclic dicarboxylic acids such as 1,4-cyclohexanedicarboxylic acid; and aromatic dicarboxylic acids such as terephthalic acid, isophthalic acid, 1,3-benzenediacetic acid, and 1,4-benzenediacetic acid. In addition, derivatives of these dicarboxylic acid compounds may be used. Examples of the derivatives include carboxylic acid halides. These can be used alone, or two or more thereof can be used in combination.

When the total of the dicarboxylic acid units in the polyamide compound of the present disclosure is 100 mol %, the content of dicarboxylic acid units other than the dicarboxylic acid represented by the general formula (1) is not particularly limited. The content of dicarboxylic acid units other than the dicarboxylic acid represented by the general formula (1) is preferably less than 50 mol %, more preferably less than 20 mol %, particularly preferably less than 10 mol %. This is because when the content of dicarboxylic acid units other than the dicarboxylic acid unit represented by the general formula (1) is within this range, the self-healing properties are improved.

[1-2] Diamine Unit

The diamine unit in the polyamide compound of the present disclosure includes a diamine unit represented by the general formula (2):

[Chemical Formula 7]

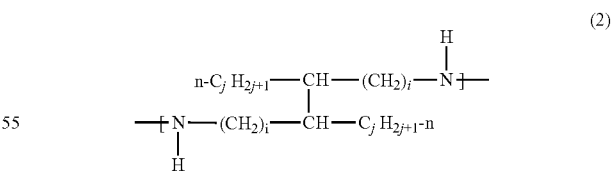

(2)

wherein i represents an integer from 2 to 12, and j represents an integer from 2 to 18.

As the diamine unit, the following units are particularly preferred. The unit which will be shown below is derived from a plant, which is preferable from the viewpoint of preventing global warming and reducing resource risk. Moreover, when the polyamide compound has the unit which will be shown below, it tends to be high in self-healing properties.

[Chemical Formula 8]

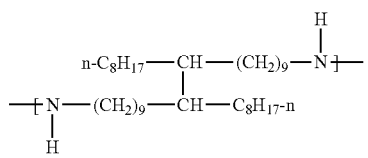

When the total of the diamine units in the polyamide compound of the present disclosure is 100 mol %, the diamine unit represented by the general formula (2) is preferably contained in an amount of 5 to 100 mol %, more preferably 20 to 100 mol %, particularly preferably 30 to 100 mol %. This is because when the content of the diamine unit represented by the general formula (2) is within this range, excellent self-healing properties are obtained.

The compound that can constitute a diamine unit other than the diamine unit represented by the general formula (2) is not particularly limited.

Examples of diamines other than the diamine unit represented by the general formula (2) can include known aliphatic diamines, alicyclic diamines, aromatic diamines, and diaminoorganosiloxanes.

Examples of the aliphatic diamine that can constitute a diamine unit other than the diamine unit represented by the general formula (2) can include 1,1-metaxylylenediamine, 1,3-propanediamine, and pentamethylenediamine.

Examples of the alicyclic diamine can include 4,4'-methylenebis(cyclohexylamine) and 1,3-bis(aminomethyl)cyclohexane.

Examples of such aromatic diamines can include o-phenylenediamine, m-phenylenediamine, 4,4'-diaminodiphenylmethane, 1,5-diaminonaphthalene, 2,2'-dimethyl-4,4'-diaminobiphenyl, 4,4'-diamino-2,2'-bis(trifluoromethyl)biphenyl, 2,7-diaminofluorene, 4,4'-diamino-2,2'-dimethylbiphenyl, 9,9-bis(4-aminophenyl)fluorene, 2,2-bis[4-(4-aminophenoxy)phenyl]hexafluoropropane, 2,2-bis(4-aminophenyl)hexafluoropropane, 4,4'-(p-phenylenediisopropylidene)bisaniline, 4,4'-(m-phenylenediisopropylidene)bisaniline, 1,4-bis(4-aminophenoxy)benzene, 4,4'-bis(4-aminophenoxy)biphenyl, 2,6-diaminopyridine, 3,4-diaminopyridine, 2,4-diaminopyrimidine, 3,6-diaminoacridine, 3,6-diaminocarbazole, N-methyl-3,6-diaminocarbazole, N-ethyl-3,6-diaminocarbazole, N-phenyl-3,6-diaminocarbazole, N,N'-bis(4-aminophenyl)-benzidine, N,N'-bis(4-aminophenyl)-N,N'-dimethylbenzidine, 1,4-bis-(4-aminophenyl)-piperazine, 3,5-diaminobenzoic acid, dodecanoxy-2,4-diaminobenzene, tetradecanoxy-2,4-diaminobenzene, pentadecanoxy-2,4-diaminobenzene, hexadecanoxy-2,4-diaminobenzene, octadecanoxy-2,4-diaminobenzene, dodecanoxy-2,5-diaminobenzene, tetradecanoxy-2,5-diaminobenzene, pentadecanoxy-2,5-diaminobenzene, hexadecanoxy-2,5-diaminobenzene, octadecanoxy-2,5-diaminobenzene, cholestanyloxy-3,5-diaminobenene, cholestenyloxy-3,5-diaminobenzene, cholestanyloxy-2,4-diaminobenzene, cholestenyloxy-2,4-diaminobenzene, cholestanyl 3,5-diaminobenzoate, cholestenyl 3,5-diaminobenzoate, lanostanyl 3,5-diaminobenzoate, 3,6-bis(4-aminobenzoyloxy)cholestane, 3,6-bis(4-aminophenoxy)cholestane, 4-(4'-trifluoromethoxybenzoyloxy)cyclohexyl-3,5-diaminobenzoate, 4-(4'-trifluoromethylbenzoyloxy)cyclohexyl-3,5-diaminobenzoate, 1,1-bis(4-((aminophenyl)methyl)phenyl)-4-butylcyclohexane, 1,1-bis(4-((aminophenyl)methyl)phenyl)-4-heptylcyclohexane, 1,1-bis(4-((aminophenoxy)methyl)phenyl)-4-heptylcyclohexane, 1,1-bis(4-((aminophenyl)methyl)phenyl)-4-(4-heptylcyclohexyl)cyclohexane, 2,4-diamino-N,N-diallylaniline, 4-aminobenzylamine, 3-aminobenzylamine, 1-(2,4-diaminophenyl)piperazine-4-carboxylic acid, 4-(morpholin-4-yl)benzene-1,3-diamine, 1,3-bis(N-(4-aminophenyl)piperidinyl)propane, and α-amino-ω-aminophenylalkylene.

These can be used alone, or two or more thereof can be used in combination.

When the total of diamine units in the polyamide compound of the present disclosure is 100 mol %, the content of diamine units other than the diamine represented by the general formula (2) is not particularly limited. The content of diamine units other than the diamine represented by the general formula (2) is preferably less than 50 mol %, more preferably less than 30 mol %, particularly preferably less than 10 mol %. When the content of diamine units other than the diamine unit represented by the general formula (2) is within this range, good self-healing properties are obtained.

[1-3] Molecular Weight of Polyamide Compound

The molecular weight of the polyamide compound of the present disclosure is not particularly limited. In general, the number average molecular weight (Mn) is preferably 5,000 to 80,000, more preferably 8,000 to 60,000, particularly preferably 10,000 to 50,000. Similarly, the weight average molecular weight (Mw) is preferably 12,000 to 200,000, more preferably 18,000 to 160,000, particularly preferably 20,000 to 140,000. The molecular weight here means a value in terms of polystyrene.

[1-4] Properties of Polyamide Compound

In the polyamide compound of the present disclosure, a plant-derived compound is introduced into both the dicarboxylic acid unit and the diamine unit. The polyamide compound of the present disclosure has a long-chain branched alkyl group and has a bulky structure. Due to these characteristic structures in the polyamide compound, the resin contacted after cutting can be self-healed in a short time. When self-healing, external stimuli such as heating, pressurization and chemical reactions are not required. The restoring force of the resin bonded after cutting is substantially the same as that before cutting, as shown in the results of a tensile test which will be described later. Accordingly, the polyamide compound of the present disclosure exhibits high self-healing properties.

[2] Method for Manufacturing Polyamide Compound

The method for manufacturing the polyamide compound of the present disclosure is not particularly limited. Examples of the manufacturing method can include a method of reacting a dicarboxylic acid compound and a diamine compound.

As the dicarboxylic acid compound, a dicarboxylic acid and, additionally, a carboxylic acid derivative in which the hydroxyl group of the carboxyl group of the dicarboxylic acid is substituted with another hetero atom (atom other than carbon, hydrogen and metal) can be used. Examples of the carboxylic acid derivative include acyl halides (acid halides) in which the hydroxyl group is replaced with halogen.

The polyamide compound of the present disclosure can be manufactured by polycondensation of a diamine component that can constitute the diamine unit and a dicarboxylic component that can constitute the dicarboxylic acid unit. The degree of polymerization can be controlled by adjusting polycondensation conditions and the like.

As a method for manufacturing a polyamide compound, for example, (1) a method using an acid or base catalyst, (2) an activation method of a carboxylic acid, (3) a method using transesterification, (4) a method using a condensing agent, or the like is suitably used. Here, as a suitable manufacturing method, a method for manufacturing a polyamide compound using an acid chloride in which a carboxylic acid is activated is exemplified.

For example, a polyamide compound can be manufactured along the following manufacture scheme. In this method, a dicarboxylic acid is activated to form an acid chloride, and the acid chloride and a diamine are reacted to form a polyamide compound.

[Chemical Formula 9]

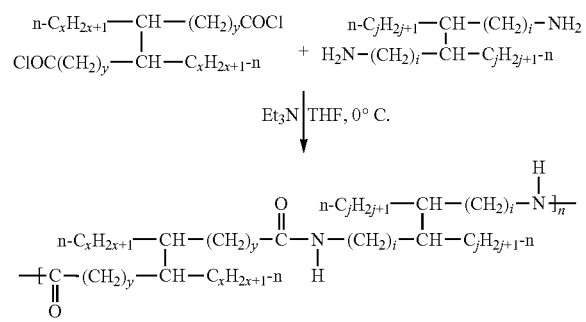

wherein x represents an integer from 6 to 12, and y represents an integer from 8 to 18; and i represents an integer of 2 to 12, and j represents an integer of 2 to 18.

When the dicarboxylic acid is activated to form an acid chloride, which is then reacted with a diamine, a polyamide compound can be efficiently manufactured.

Moreover, a monoamine or a monocarboxylic acid may be added as a molecular weight modifier at the time of polycondensation. Further, in order to suppress the polycondensation reaction to attain a desired degree of polymerization, the ratio (molar ratio) between the diamine component and the carboxylic acid component constituting the polyamide compound may be adjusted by shifting from 1.

When polymerization is carried out by a dehydrohalogenation reaction through a reaction of a carboxylic acid dihalide such as the above-mentioned acid chloride with a diamine, the reaction proceeds rapidly. Therefore, the reaction is preferably carried out at a relatively low temperature for reaction rate control.

For example, it is preferably carried out in the range of $-10°$ C. to $100°$ C.

The reaction solvent is not particularly limited, and a known solvent can be applied widely. For example, as an organic polar solvent as the reaction solvent, tetrahydrofuran, dimethylacetamide, N-methylpyrrolidone, dimethylsulfone, dimethylformamide, N-methylcaprolactam, tetramethylurea, N,N'-dimethyl-2-imidazolidinone, or the like can be exemplified. These may be used singly or as a mixed solvent of two or more thereof. Moreover, hydrogen chloride and a metal halide salt, for example, lithium chloride, calcium chloride, potassium chloride, and the like may be used in combination, as needed, to improve the solubility.

The polyamide compound concentration (polymer concentration) is not particularly limited, although it varies depending on the solubility of the produced polyamide compound in the solvent and the solution viscosity. The concentration of the polyamide compound is preferably 0.1 to 40 mass % from the viewpoint of productivity, for example.

The concentration of the polyamide compound is determined by comprehensively judging the compositional contents and composition ratio of the polyamide compound, the solubility, the solution viscosity, the handleability, and the ease of defoaming.

The method of adding the raw materials is not particularly limited. For example, after adding diamine to the reaction solvent and dissolving it at a low temperature, a dicarboxylic acid halide such as acid chloride as one raw material is added. In this case, in order to prevent deterioration of the diamine, it is preferable to add the halide under an inert atmosphere (for example, under nitrogen atmosphere or argon gas atmosphere). The molar ratio between the diamine and acid the halide should basically be equimolar, but the diamine or acid component as one raw material may be added excessively to control the degree of polymerization, or an appropriate amount of a monofunctional organic substance such as aniline, naphthylamine, acetic acid chloride or benzoyl chloride may be added.

In addition, in the case of the polyamide compound of the present disclosure, in order to improve the properties, an addition method intended to block the polymer may be adopted such that a part of the diamine or acid halide is reacted and then the remaining raw materials are added.

The polymerization reaction product (polyamide compound) thus obtained is accompanied by hydrogen halide, which is a byproduct, and therefore needs to be neutralized. The neutralizing agent is not particularly limited as long as it is a generally, known basic compound.

As the neutralizing agent, triethylamine, tripropylamine, benzyldimethylamine, lithium hydroxide, sodium hydroxide, potassium hydroxide, magnesium hydroxide, calcium hydroxide, magnesium oxide, calcium oxide, tetraethylammonium salt, etc. can be preferably used. Further, such a neutralizing agent may be added as a powder alone, but it is preferable from the viewpoint of reactivity and operability to use a finely divided powder dispersed in an organic solvent as a slurry.

The polyamide compound solution obtained by the above method can be separated in a poor solvent such as water or methanol. The solution after the neutralization reaction can also be used as a molding solution as it is.

Moreover, an industrial polycondensation method for the polyamide compound of the present disclosure is not particularly limited, and a well-known method is used widely. Examples of the method include a pressurized salt method, a normal pressure dropping method, a pressure dropping method, and a reactive extrusion method. Further, when the reaction temperature is as low as possible, yellowing and gelation of the polyamide compound can be suppressed, so that a polyamide compound having stable properties can be obtained.

The pressurized salt method is a method of performing melt polycondensation under pressure using a nylon salt as a raw material. Specifically, after preparing an aqueous nylon salt solution containing a diamine component, a dicarboxylic acid component, and, if necessary, other components, the aqueous solution is concentrated, then heated under pressure, and polycondensation is performed while condensed water is removed. While the inside of the can is gradually returned to normal pressure, the temperature is raised to about the melting point of the polyamide compound+about $10°$ C. and held. Then, while the pressure is further gradually reduced to 0.02 MPaG, the temperature is kept at the same temperature to continue polycondensation. When a certain stirring torque is reached, the inside of the can is pressurized to about 0.3 MPaG with nitrogen to recover the polyamide compound.

In the normal pressure dropping method, a diamine component is continuously dropped into a mixture obtained by heating and melting a dicarboxylic acid component and, if necessary, other components under normal pressure, and polycondensation is performed while condensed water is removed. The polycondensation reaction is performed while the temperature of the reaction system is raised so that the reaction temperature does not fall below the melting point of the polyamide compound to be produced.

In the pressure dropping method, first, a dicarboxylic acid component and, if necessary, other components are charged into a polycondensation can, and the components are stirred to be melt mixed, thereby preparing a mixture. Next, the diamine component is continuously added dropwise to the mixture while the inside of the can is preferably pressurized to about 0.3 to 0.4 MPaG, and polycondensation is performed while condensed water is removed. At this time, the polycondensation reaction is performed while the temperature of the reaction system is raised so that the reaction temperature does not fall below the melting point of the polyamide compound to be produced. When the set molar ratio is reached, the addition of the diamine component is terminated. While the inside of the can is gradually returned to normal pressure, the temperature is raised to about the melting point of the polyamide compound+about 10° C. and held. Then, while the pressure is further gradually reduced to 0.02 MPaG, the temperature is kept at the same temperature to continue polycondensation. When a certain stirring torque is reached, the inside of the can is pressurized to about 0.3 MPaG with nitrogen to recover the polyamide compound.

The reactive extrusion method is a method of incorporation into a polyamide skeleton by an amide exchange reaction.

[3] Polyamide Composition Using Polyamide Compound

Additives such as lubricants, crystallization nucleating agents, anti-whitening agents, matting agents, heat stabilizers, weathering stabilizers, ultraviolet absorbers, plasticizers, flame retardants, antistatic agents, coloring inhibitors, antioxidants, and impact resistance improvers may be added to the polyamide compound of the present disclosure depending on the application and performance to form polyamide compositions. These additives can be added as necessary as long as the effects of the present invention are not impaired. In addition, the polyamide compound of the present disclosure may be mixed with various resins according to required application and performance to form polyamide compositions.

[4] Application of Polyamide Compound

The application of the polyamide compound is not particularly limited. For example, the polyamide compound is used as clothing, paints, coating agents, cosmetics, adhesives, electronic equipment materials, building materials, concrete reinforcing agents, printing inks, aircraft materials, spacecraft materials, and the like.

EXAMPLES

Hereinafter, the present disclosure will be described more specifically by way of Examples.

1. Synthesis of Polyamide Compound

Example 1

A polyamide compound of Example 1 was synthesized according to the following scheme.

[Chemical Formula 10]

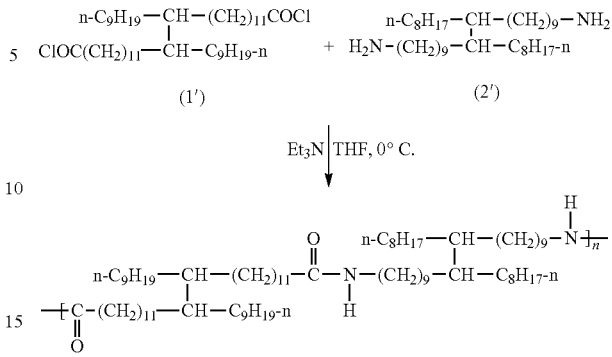

Specifically, diamine (2') (42.9 g, 80.0 mmol) and THF (200 mL) were placed in a separable flask (Separable flask (500 mL)) in a nitrogen atmosphere, stirred at room temperature for a while using a mechanical stirrer, and then triethylamine (22.4 mL, 160.0 mmol) was added. Thereafter, the mixture was stirred for 5 minutes. Thereafter, an acid chloride (1') (57.2 g, 80.0 mmol) was dissolved in THF (100 mL) and added dropwise, followed by reaction at room temperature for 3 hours. After completion of the reaction, the product was reprecipitated and purified using water, and washed with water, acetone and methanol. The product was vacuum dried (80° C., 8 hours). Yield: 90.0 g. FT-IR (ATR, cm$^{-1}$): 3296.7 (NH, amide), 2921.6, 2851.2, 1654.6 (C=O, carbonyl), 1605.4, 1541.8, 1498.4, 1228.4, 830.2, 721.2, 513.0.

2. Test Method 2-1. Static Tensile Test

For tensile properties, a tensile test was performed to evaluate the yield stress (tensile strength) and the elongation at break. The test piece was the polyamide compound synthesized in Example 1, and was produced as a strip-shaped test piece (70 mm×16 mm×7 mm). In measurement, the width and thickness of the test piece were measured and employed. For the measurement, a desktop precision universal testing machine AG-Xplus testing machine was used. The measurement conditions were a tensile speed of 20 mm/sec and a measurement temperature of 23° C.

2-2. High-Speed Tensile Test

In the high-speed tensile test, it was evaluated whether the break of the test piece depends on the speed, by pulling the test piece at a high speed. As the test piece, a strip-shaped test piece (70 mm×16 mm×7 mm) was prepared and used. In measurement, the width and thickness of the test piece were measured and employed. A high-speed tensile testing machine HITS-TX was used for the measurement. The measurement conditions were a tensile speed of 5 m/sec and a measurement temperature of 23° C.

3. Test Results

Table 1 shows the test results of 2-1. Static tensile test. Table 2 shows the test results of 2-2. High-speed tensile test. The restoration time is the elapsed time from adhesion of the cut surfaces to each other after cutting of the test piece, and the unit is "minute". Each of the static tensile test and the high-speed tensile test described above was performed when the restoration time passed.

TABLE 1

Static tensile test results

| Restoration time (min) | Test force (N) | Breaking point stroke (mm) |
|---|---|---|
| 15 | 15.8 | >800 |
| 5 | 15.0 | >800 |

TABLE 2

High-speed tensile test results

| Restoration time (min) | Test force (kN) at maximum test force point | Stress (MPa) at maximum test force point | Breaking point stroke (mm) |
|---|---|---|---|
| 15 | 0.289 | 2.580 | >140 |
| 5 | 0.284 | 2.533 | >140 |

As shown in the test results of Tables 1 and 2, the test piece of Example 1 had a breaking point stroke of 800 mm or more in the static tensile test and a breaking point stroke of 140 mm or more in the high-speed tensile test, after the elapse of a very short time of 5 minutes after bonding. These results were almost the same as those in the case of not cutting, and it was confirmed that the test piece was restored in a very short time.

4. Molecular Weight Evaluation of Polyamide Compound 4-1. Measurement Method

The molecular weight of a polyamide compound of Example 1 was determined by measurement by GPC (Gel Permeation Chromatography).

For measurement, a measuring device (HLC-82220GPC) manufactured by Tosoh Corporation (using an RI detector) was used, a column Shodex GPC KF-806L×3 manufactured by Showa Denko K.K. was used. The measurement conditions were as follows.

GPC measurement was made under the conditions: eluent: tetrahydrofuran (THF); standard substance: polystyrene (PS); sample concentration: 0.2 w/v %; injection volume: 100 µL; flow rate: 1.0 mL/min; and column temperature: 40° C.

4-2. Measurement Results

Table 3 indicates measurement results.

TABLE 3

Molecular weight of self-healing bio-based polyamide.

| | Number average molecular weight Mn (×10$^4$) | Weight average molecular weight Mw (×10$^4$) | Degree of Distribution Mw/Mn |
|---|---|---|---|
| Example 1 | 1.5 | 4.2 | 2.8 |

5. Effect of Example

The polyamide compound of the Example had self-healing properties without introducing urethane and urea bonds into the polymer skeleton.

The test piece of the polyamide compound bonded after cutting self-healed at a high speed in a short time (several minutes).

Further, the polyamide compound was evaluated for the restoring force by the static and high-speed tensile tests, and as a result, had self-healing properties in which the restoring force was unchanged before and after cutting.

The polyamide compound of the Example is a resin that is linked by an amide bond and has self-healing properties.

The polyamide compound of the Example is a resin that exhibits an adhesive force immediately after bonding and maintains the adhesive force thereafter. In particular, it can self-heal simply by bringing the cut (broken) surface into contact again after cutting (breaking), and has very excellent properties that heating, pressure and chemical reaction are not required. As described above, the polyamide compound of the Example is derived from a plant, has excellent characteristics that it can maintain the adhesive force even after a short time after cutting, and that the restoring force of the resin is almost unchanged before and after cutting.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the scope of the appended claims, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, within the scope of the appended claims.

The present invention is not limited to the embodiments described in detail above, and can be modified or changed in various manners within the scope as set forth in the claims of the present invention.

The polyamide compound of the present invention is used for a wide range of applications. In particular, it is suitably used in applications that require self-healing properties.

The invention claimed is:

1. A polyamide compound comprising:
   a dicarboxylic acid unit represented by the following general formula (1); and
   a diamine unit represented by the following general formula (2):

$$n-C_xH_{2x+1}-CH-(CH_2)_y-\overset{O}{\underset{\|}{C}}+ \quad +\overset{O}{\underset{\|}{C}}-(CH_2)_y-CH-C_xH_{2x+1}-n \quad (1)$$

wherein x represents an integer from 6 to 12, and y represents an integer from 8 to 18; and $$n-C_jH_{2j+1}-CH-(CH_2)_i-\overset{H}{\underset{|}{N}}+ \quad +\overset{H}{\underset{|}{N}}-(CH_2)_i-CH-C_jH_{2j+1}-n \quad (2)$$

wherein i represents an integer from 2 to 12, and j represents an integer from 8 to 18.

2. The polyamide compound according to claim 1, wherein, in the dicarboxylic acid unit represented by the general formula (1), x=9 and y=11, and, in the diamine unit represented by the general formula (2), i=9 and j=8.

3. The polyamide compound according to claim 1, wherein, in the dicarboxylic acid unit represented by the general formula (1), x=8 to 10.

4. The polyamide compound according to claim 1, wherein, in the dicarboxylic acid unit represented by the general formula (1), y=9 to 13.

5. The polyamide compound according to claim 1, wherein, in the dicarboxylic acid unit represented by the general formula (1), x=8 to 10 and y=9 to 13.

* * * * *